(12) United States Patent  
Lee

(10) Patent No.: US 6,594,236 B1
(45) Date of Patent: Jul. 15, 2003

(54) ALARM SUPPRESSING METHOD FOR OPTICAL TRANSMISSION APPARATUS

(75) Inventor: Jung Gu Lee, Anyang (KR)

(73) Assignee: LG Information & Communications Ltd., Seoul (KR)

( * ) Notice: Subject to any disclaimer, the term of this patent is extended or adjusted under 35 U.S.C. 154(b) by 0 days.

(21) Appl. No.: 09/223,751

(22) Filed: Dec. 31, 1998

(30) Foreign Application Priority Data

Aug. 12, 1998 (KR) .......................................... 1998/32770

(51) Int. Cl.[7] ................................................. H04L 1/00
(52) U.S. Cl. ......................................... 370/242; 370/216
(58) Field of Search ................................. 370/216–228, 370/241–249; 714/46–48, 25, 1, 2; 379/1, 26

(56) References Cited

U.S. PATENT DOCUMENTS

| | | | | |
|---|---|---|---|---|
| 4,853,927 A | * | 8/1989 | Wenzel ........................ 370/218 |
| 5,627,821 A | * | 5/1997 | Miyagi ........................ 370/242 |
| 5,636,206 A | * | 6/1997 | Amemiya et al. .......... 370/244 |
| 5,946,373 A | * | 8/1999 | Harris ......................... 370/242 |
| 5,991,264 A | * | 11/1999 | Croslin ....................... 370/225 |

* cited by examiner

Primary Examiner—Steven Nguyen
(74) Attorney, Agent, or Firm—Fleshner & Kim L.L.P.

(57) ABSTRACT

An alarm suppressing method for an optical transmission apparatus includes the steps of checking whether a detected alarm is a root alarm, suppressing a first propagation alarm generated by the root alarm when the detected alarm is a root alarm, determining the types of network elements, suppressing a second propagation alarm generated by the root alarm in accordance with the determined types of the network elements, and suppressing a third propagation alarm generated in accordance with the second propagation alarm. The method further includes the steps of recognizing the direction of a detected propagation alarm, retrieving an element next to the recognized direction, checking the kind of the generated propagation alarm, and suppressing a corresponding propagation alarm when a data base includes a root alarm by retrieving from the data base the information relevant to the root alarm in accordance with the kinds of the checked alarms.

20 Claims, 8 Drawing Sheets

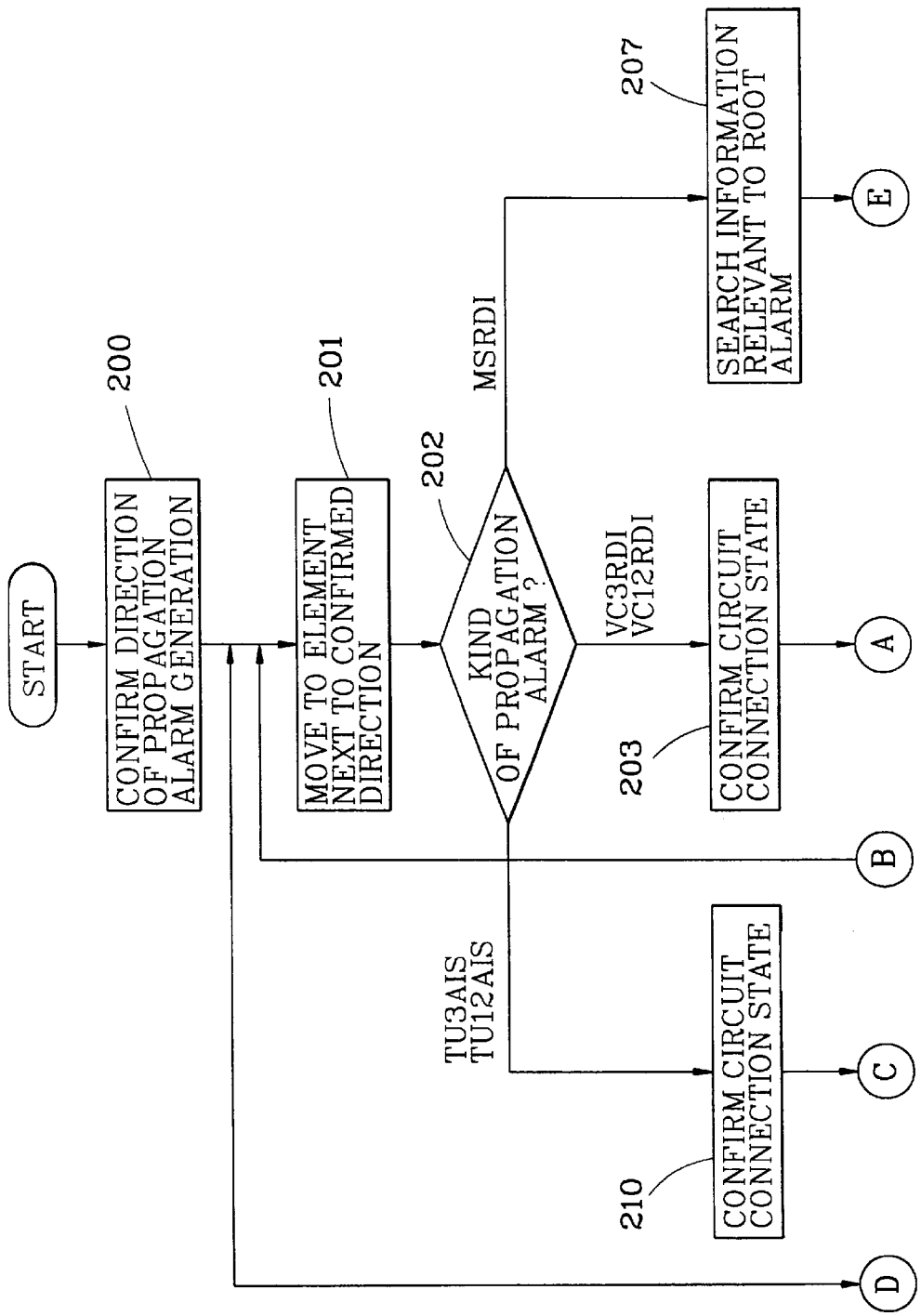

ALARM SUPPRESSING METHOD FOR OPTICAL TRANSMISSION APPARATUS

BACKGROUND OF THE INVENTION

1. Field of the Invention

The present invention relates to an optical communication network, and more particularly, to an improved alarm suppressing method for an optical transmission apparatus which is capable of promptly retrieving problems in an optical communication network.

2. Description of the Background Art

In general, a communication network is formed of a plurality of different elements manufactured from different makers. The communication elements generate alarm when there occurs a fault in its own or internal connections. Since the network elements don't recognize topology of communication network, a single fault in the communication network may seriously influence on the operation of other different elements and as a result there may occur a plurality of secondary alarms from the elements. Here, the former alarm is referred to as a root alarm and the latter as a propagation alarm.

Presently, a communication network management is manually controlled by humans. An operator in a central control chamber is directed to analyze kinds of alarms, generated locations, kinds of discharged alarms and locations, etc., on the ground of alarms displayed on a console and users' dissatisfaction. An appropriate solution has been taken according to the analyses. Therefore, if there occurs an error in a single optical line with regard to an optical communication device, it inevitably leads to a communication malfunctioning to a plurality of subscribers. Accordingly, it has been understood significant to analyze the root and propagation alarms with regard to maintenance and management of optical communication devices.

FIG. 1 is a block diagram illustrating an entire network interfacing of a synchronous optical transmission devices, wherein a first linear network 100, a second linear network 110 and a ring mode network 120 are interfaced to an EMS(element management system) 38 through a LAN (local area network) 36.

At this time, respective network elements NE in the first and second linear networks 100, 110 and in the ring mode network 120 have different names depending upon their locations. That is, the network elements 10, 12, 14,22 in the first and second linear networks 100, 110 are respectively referred to as a TM (terminal multiplexer) since they form terminal elements. The network elements 16, 18, 20 disposed in the middle of the second linear network 110 are respectively called as an ADM (add drop multiplexer). Also, the network elements 24, 26, 28, 30,32,34 in the ring mode network 120 are respectively referred to as an RM (ring multiplexer).

The EMS 38 serves to monitor the root alarm and propagation alarms generated from the respective network elements NE and the operator employs a computer to implement maintenance and management of optical communication lines.

The optical communication device SDH155 (synchronous digital hierarchy 155) employed in the present invention enables communication through 155 Mbps high speed transmission. Here, one optical line represents 1900 lines of telephone circuit. Typically, an optical communication device is required to include two optical lines: one for reception, the other for transmission. Here, a preliminary line may be reserved when necessary.

Specifically, one optical line may be used as 3 lines of 36 Mbps VC3 (virtual container 3) class and 63 lines of 2.048 Mbps VC12 class, one line of VC3 class and 42 lines of VC12 class, or 2 lines of VC3 class and 21 lines of VC12 class.

FIGS. 2 and 3 show circuit connections at a linear mode and a ring mode, respectively, according to the conventional art. With reference to the drawings, the alarm suppressing method for an optical transmission apparatus will now be explained. For convenience's sake, it is assumed that one line of VC 3 class and 42 lines of VC 12 class are employed as an optical line and an example will be taken in a state in which the optical line 42 of the element 34 in the ring mode network 110 is shorted and causes an obstacle.

As shown in FIGS. 3 and 4, when the optical line 42 is broken, the element 34 generates a root alarm STM1LOS (LOS denotes loss of signal) of its own through the optical line 42, and the element 34 transmits to the element 32 a propagation alarm with the information that the element 34 has generated the root alarm STM1LOS toward west direction W. As a result, the propagation alarm MSRDI (RDI denotes remote defect indication) is detected from east direction E of the element 32.

Also, the element 34 generates one propagation alarm TU3AIS (AIS denotes alarm indication signal) and generates 42 propagation alarms TU12AIS through the VC12 class circuit. Accordingly, the propagation alarm TU3AIS is transmitted to the element 28 at a terminal point of the VC3 class circuit through the optical lines 44, 45, 46. The propagation alarm TU12AIS is transmitted to the element 26 at a terminal point of the VC12 class through the optical line 45. As a result, the propagation alarm TU3AIS of VC3 class circuit is detected at west direction W of each of the elements 24, 26, 28, and the propagation alarm TU12AIS of VC12 class circuit is detected at west direction W of the element 26. At this time, the propagation alarm TU3AIS is detected from each of the elements 24, 26, 28 with regard to VC3 class line, and the propagation alarm TU12AIS is detected from the element 26 serving as an end terminal, with regard to VC3 class lines.

Therefore, the element 28 serving as an end terminal of the VC3 class line transmits the other propagation alarms VC3RDI toward both directions thereof through the optical line 46', 47, and the element 26 serving as an end terminal transmits 42 lines of the other propagation alarm VC12RDI toward both directions thereof through the optical line 45', 46. As a result, the propagation alarm VC3RDI is detected at the element 32 serving as the end terminal of the VC3 class, and the 42 lines of the propagation alarm VC12RDI is detected at the element 30 serving as the end terminal.

Consequently, through the LAN 36 the EMS 38 detects one root alarm LOS, one propagation alarm MSRDI, three propagation alarms TU3AIS, 42 propagation alarms TU12AIS, one VC3 class propagation alarm VC3RDI, 42 VC12 class propagation alarms VC12RDI. Therefore, the system operator analyzes 90 alarms in total which are displayed on the EMS 38 and understands the connection of the propagation alarms generated from the root alarm LOS and the alarm using the locations and the connection state of the respective elements. Also, in the linear mode network 100, the same steps as above are taken to understand the optical line which has generated the root alarms.

However, the conventional alarm suppressing method of an optical transmission apparatus requires an operation of ability to recognize mutual connection of the alarms by analyzing a plurality of alarms detected. Further, the conventional alarm suppressing method of the conventional optical transmission apparatus may delay solution of breakdown and incur a time loss, thereby deteriorating system reliability.

SUMMARY OF THE INVENTION

The present invention is directed to overcoming disadvantages of the conventional alarm suppressing method for an optical transmission apparatus.

Therefore, it is an object of the present invention to provide an alarm suppressing method for an optical transmission method capable of automatically analyzing a mutual relation between root alarm and propagation alarm.

It is another object of the present invention to provide an alarm suppressing method for an optical transmission method enabling a prompt implementation of maintenance and management of optical lines by recognizing the optical lines of root alarm generation and analyzing the mutual relation between root alarm and propagation alarm within a short time period.

To achieve the above-described objects, there is provided an alarm suppressing method for an optical transmission apparatus according to the present invention which includes the steps of checking whether a detected alarm is a root alarm, suppressing a first propagation alarm generated by the root alarm when the detected alarm is a root alarm, determining the types of network elements, suppressing a second propagation alarm generated by the root alarm in accordance with the determined types of the network elements, and suppressing a third propagation alarm generated in accordance with the second propagation alarm.

Further, to achieve the above-described objects, there is provided an alarm suppressing method for an optical transmission apparatus according to the present invention which includes the steps of recognizing the direction of a detected propagation alarm, retrieving an element next to the recognized direction, checking the kind of the generated propagation alarm, and suppressing a corresponding propagation alarm when a data base includes a root alarm by retrieving from the data base the information relevant to the root alarm in accordance with the kinds of the checked alarms.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein:

FIG. 9 is a flow chart illustrating the suppression of corresponding propagation alarm when a propagation is initially generated.

DETAILED DESCRIPTION OF THE PREFERRED EMBODIMENTS

Figure 1:
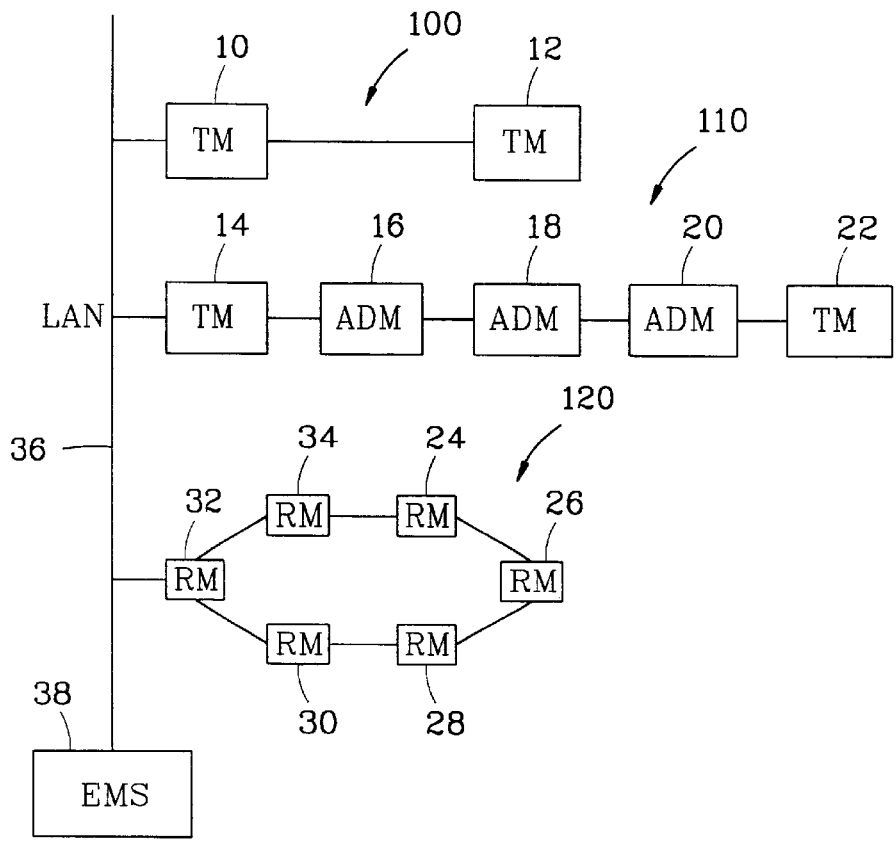
FIG. 1 is a block diagram illustrating the entire network connection of a synchronous optical transmission apparatus.
Figure 2:
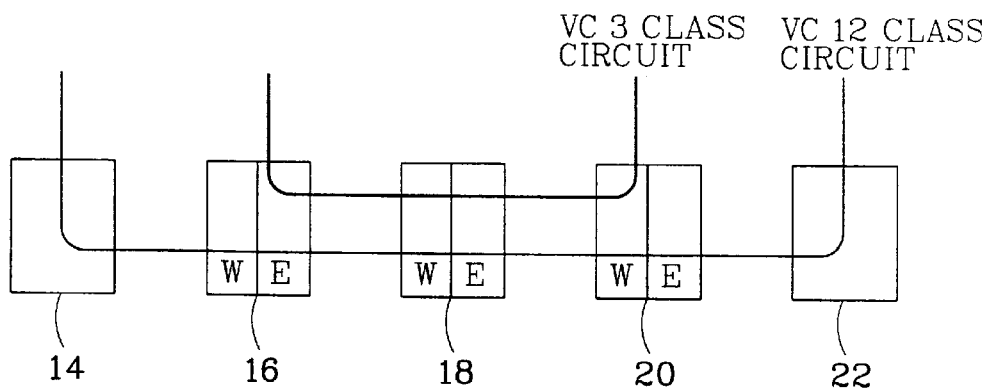
FIG. 2 is a view illustrating line connection of a linear network.
Figure 3:
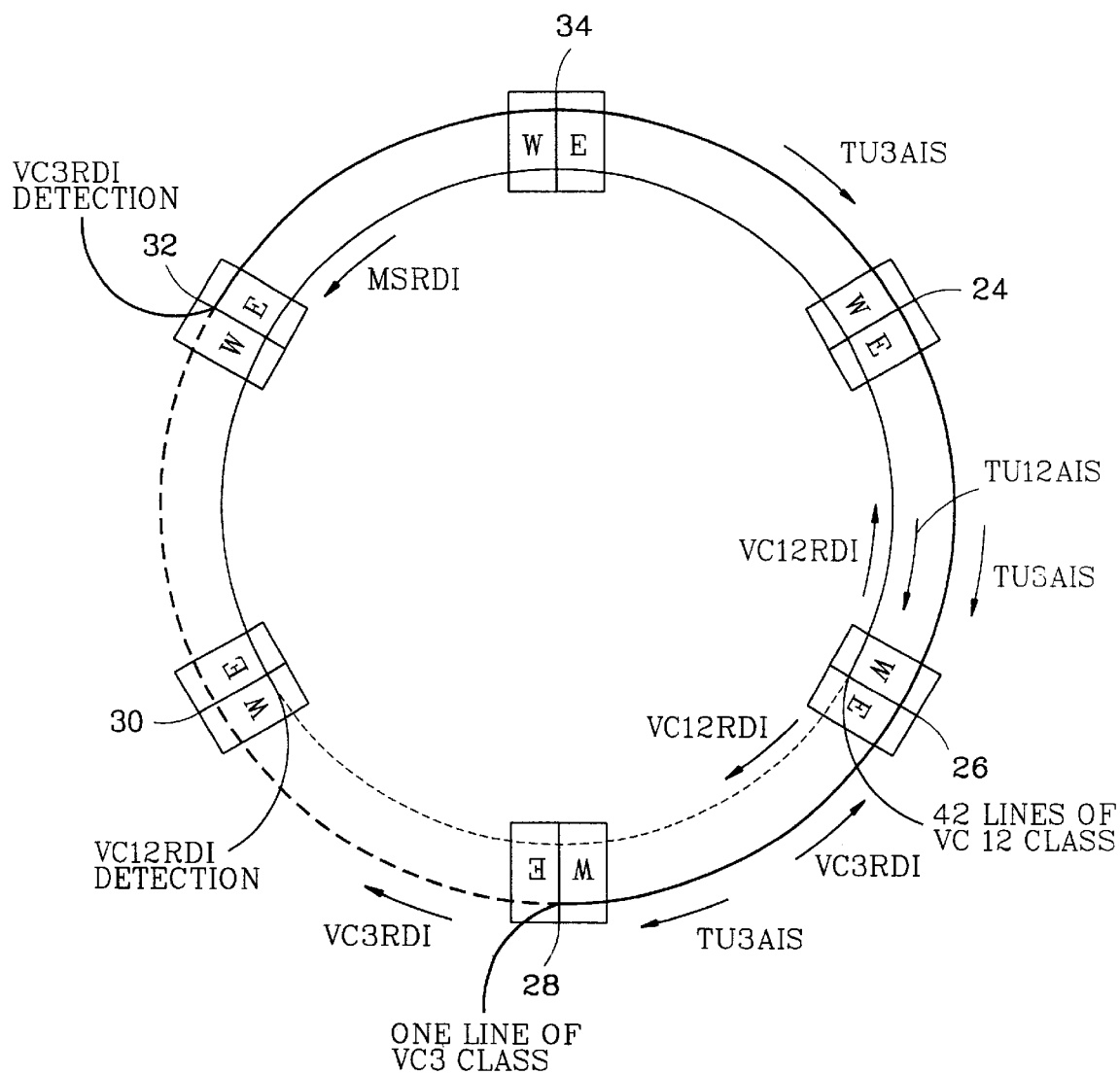
FIG. 3 is a view illustrating the line connection and propagation alarm of a ring mode network.
Figure 4:
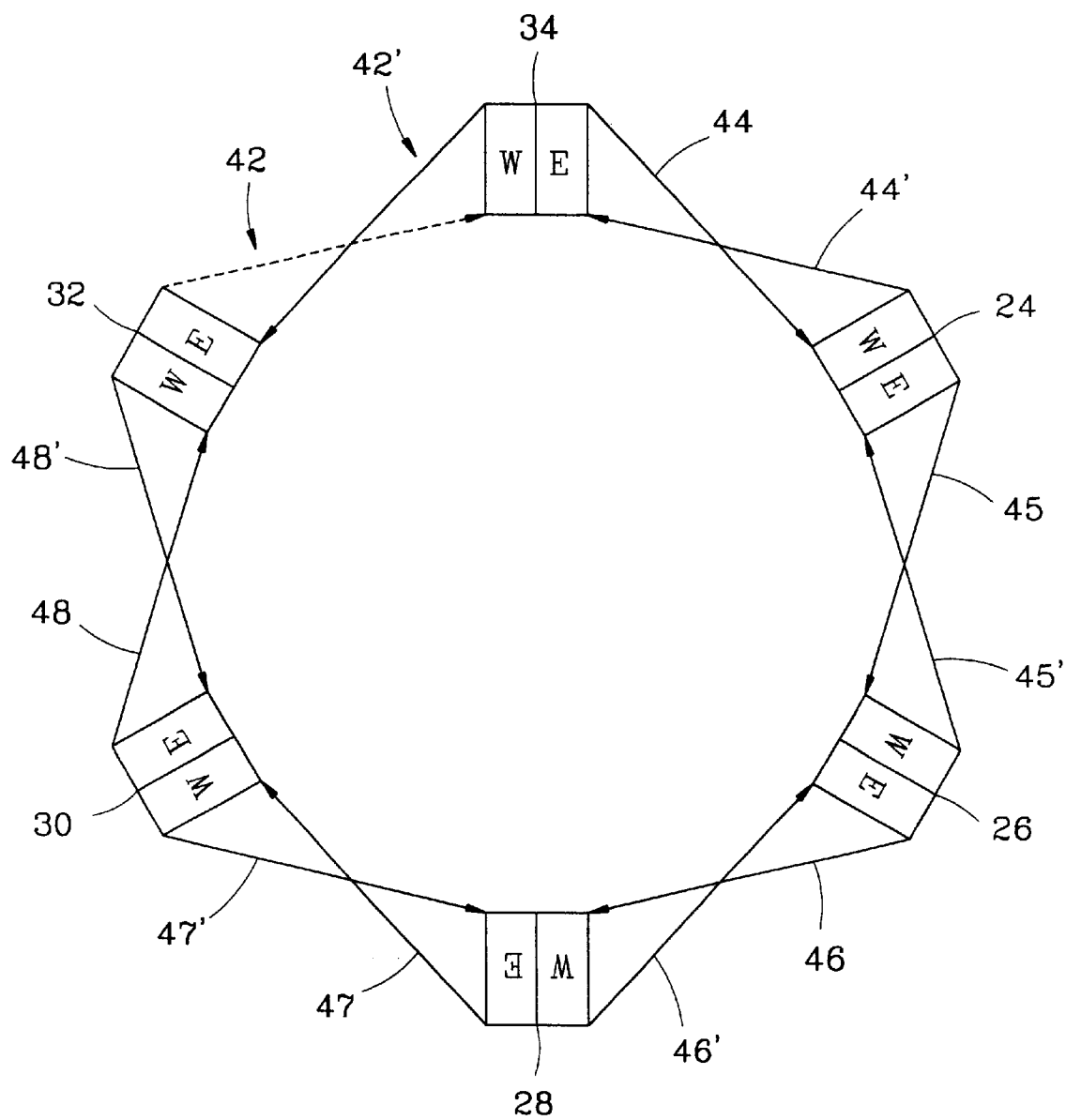
FIG. 4 is a view illustrating connection state of an optical transmission apparatus and element locations in the ring mode network.

As shown in FIG. 3 and 4, when there occurs a fault in the optical line 42, the element 34 generates a root alarm STM1LOS, the element 34 generated a propagation alarm MSRDI indicating that a root alarm STM1LOS is generated toward west direction W at the element 34. The element 34 generates one propagation alarm TU3AIS through the VC 3 class line toward east direction E thereof, and 42 propagation alarms TU12AIS are generated through the VC12 class line. As a result, the propagation alarms TU3AIS is transferred to the element 28 serving as an end terminal of the VC3 class line and the propagation alarm TU12AIS is transferred to the element 26 serving as an end terminal of the VC12 class line.

Therefore, the propagation alarm MSRDI is detected at east direction E of the element 32 and the root alarm STM1LOS is detected at west direction W of the element 34. The propagation alarm TU3AIS with regard to the VC3 class line is detected at west direction W of each of the elements 24, 26, 28, and the propagation alarm TU12AIS with regard to the VC12 class line is detected at west direction W of the element 26. The detected results are applied through the LAN 36 to the EMS 38.

Also, the propagation alarm VC3RDI is generated at both directions of the element 28 serving as an end terminal of the VC3 class line, and 42 propagation alarms VC12RDI are generated at both directions of the element 26 serving as an end terminal of the VC12 class lines. As a result, the 42 propagation alarms VC12RDI are detected at the element 30 serving as an end terminal of the VC12 class lines. Accordingly, the EMS 38 receives the detected alarms, analyzes connection of the root alarm and the propagation alarm and suppresses the propagation alarm. At this time, the propagation alarms EMS 38 may be applied to the EMS 38 in the orders of propagation-root-propagation alarms, root-propagation-propagation alarms or root-propagation alarms.

Figure 5:
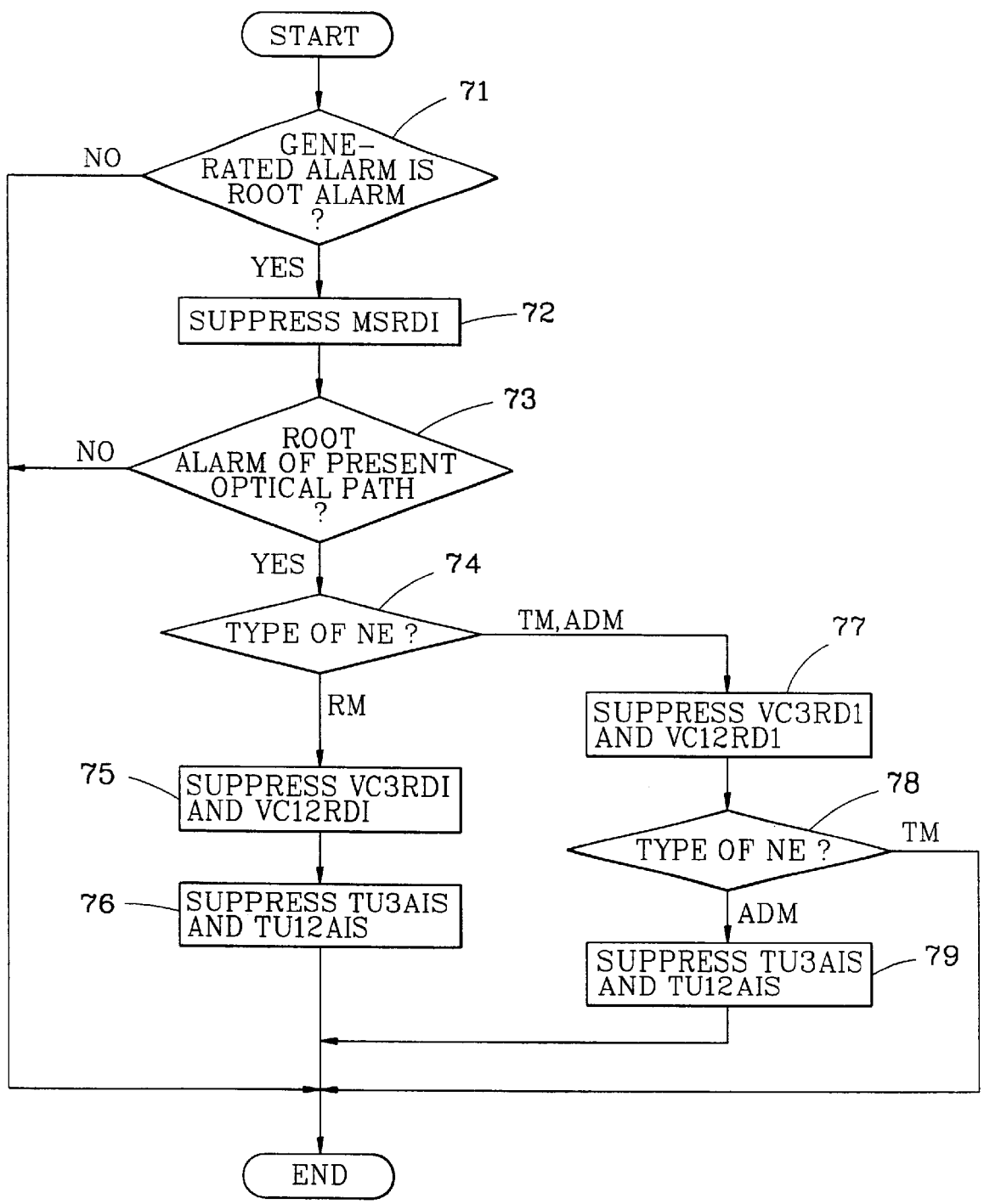
FIG. 5 is a flow chart illustrating the suppression of propagation alarm when a root alarm is initially generated.

FIG. 5 is a flow chart illustrating an alarm suppressing method for an optical transmission apparatus according to a first embodiment of the present invention. In the first embodiment, a root alarm is detected after a propagation alarm.

As shown in FIG. 5, when there occurs an alarm, the EMS 38 confirms whether the generated alarm is a root alarm or a propagation alarm in step 71. Presently, the propagation alarm is initially applied so that the EMS 38 terminates the step. Then, it is determined that a root alarm is received after the implementation of step 71, the EMS 38 implements a suppression subroutine of the propagation alarm MSRDI in step 72.

When the propagation alarm is suppressed by the implementation of step 72, the EMS 38 checks whether the root alarm STM1LOS is an alarm generated by a presently operating optical line or an alarm generated by a preliminary optical line in step 73. If the root alarm STM1LOS is an alarm generated by a preliminary path, the EMS 38 terminates the operation, and if the root alarm is an alarm generated by the presently operating optical line, the type of network element is determined in step 74.

According to the determination, if the network element is in a ring mode RM, the EMS 38 sequentially performs the suppression subroutines of the propagation alarms VC3RDI, VC12RDI, and the propagation alarms TU3AIS, TU12AIS in steps 75, 76. If the determined network element is in a linear mode (TM, ADM), the EMS 38 performs the suppression of the propagation alarms VC3RDI, VC12RDI in step 77 and carries out a suppression subroutine of the propagation alarms TU3ASIS, TU12AIS in accordance with the result of whether it is TM or ADM in step 78. That is, in case of ADM, the suppression subroutine of step 79 is carried out with regard to the propagation alarms TU3AIS, TU12AIS, whereas in case of TM since the propagation alarms TU3AIS, TU12AIS are not generated it does not implement the suppression subroutine of step 79.

The steps will now be further described.

Figure 6:
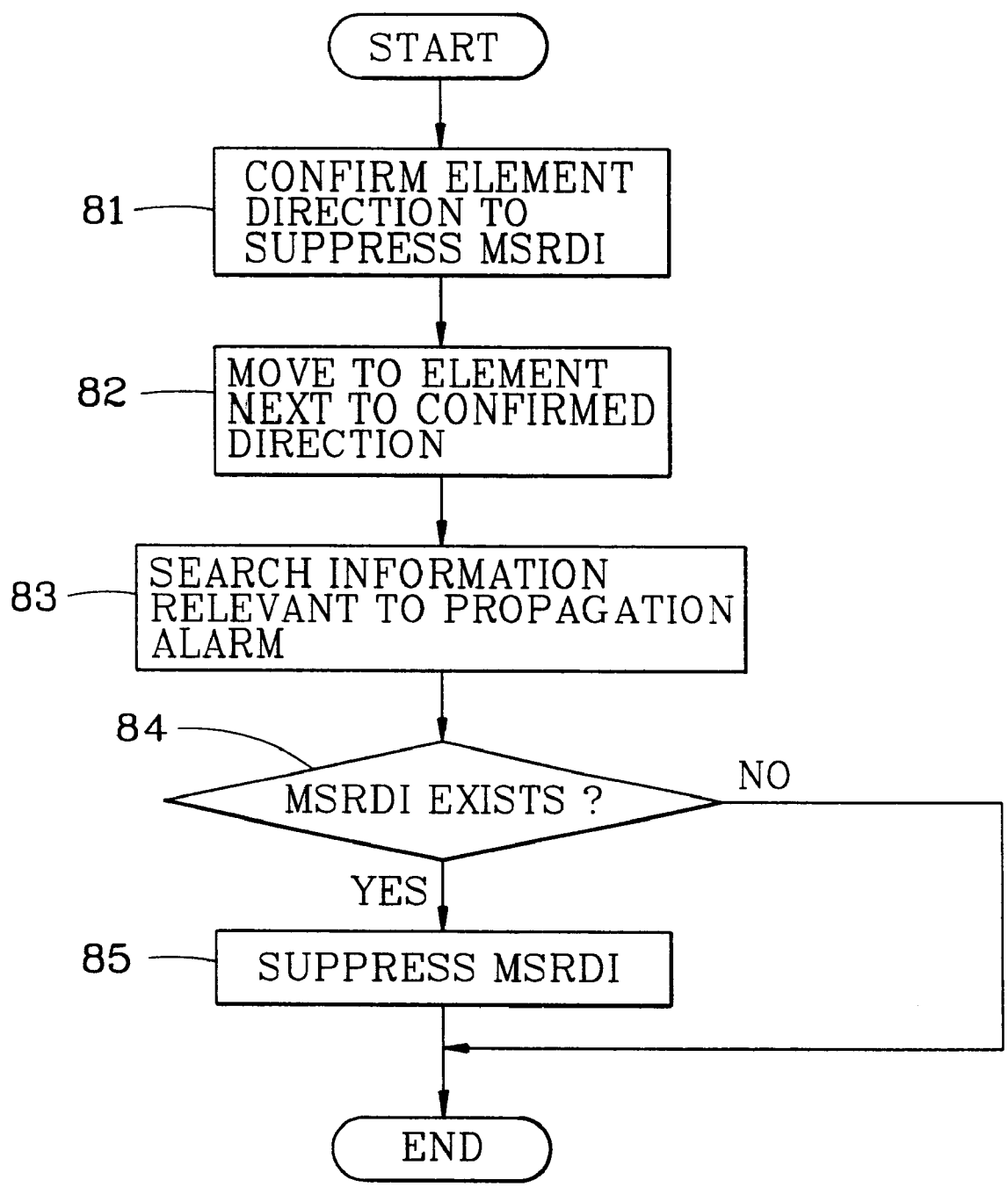
FIG. 6 is a flow chart illustrating the suppression of a propagation alarm MSRDI in FIG. 5.

FIG. 6 is a flow chart illustrating the suppression of the propagation alarm MSRDI.

First, the EMS 38 confirms the connection state of the optical line to determine which direction of the element 34 which has detected the root alarm STM1LOS the propagation alarm MSRDI is generated to in step 81. Since the present propagation alarm MSRDI is generated toward west direction W of the element 34, in step 82 the EMS 38 moves to the element 32 on the ground of the location of the element 34 and the confirmed west direction W thereof and retrieves the information relevant to the propagation alarm from a data base in step 83. At step 84, it is determined if there is a propagation alarm MSRDI generated at the element 32 in the alarm management data. If so, the suppression ID is marked as LOG ID number of the root alarm, thereby suppressing the propagation alarm MSRDI, in step 85.

That is, the alarm management data of the EMS 38 includes LOG ID representing generation sequence of alarms and the suppression ID is marked as "0" at an initial stage. The suppression ID is replaced by LOG ID of the root alarm STM1LOS which has generated the propagation alarm during the suppression step. As a result, it is understood that the information marked at the suppression ID is a propagation alarm MSRDI, thereby easily tracing the root alarm STM1LOS.

Figure 7:
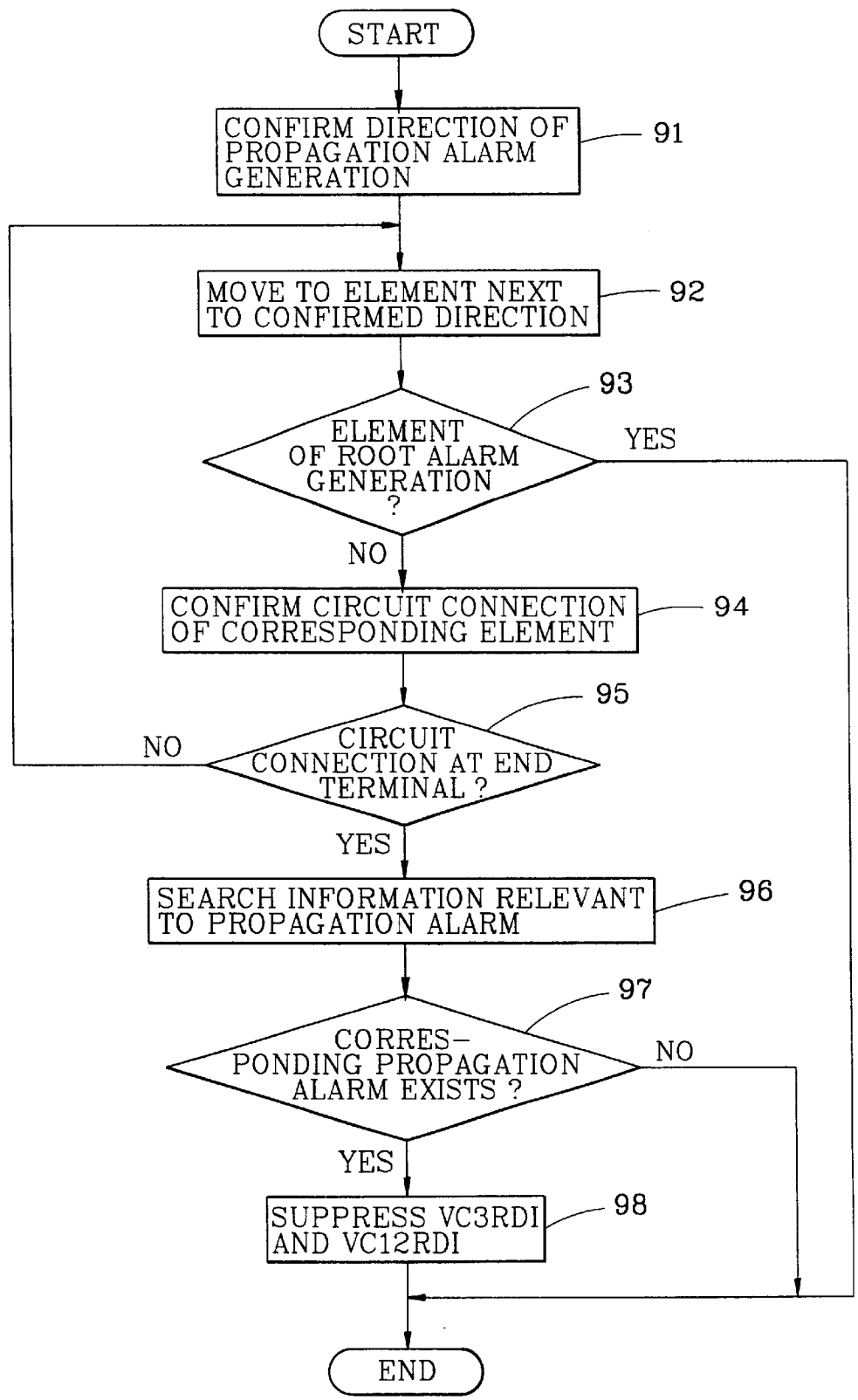
FIG. 7 is a flow chart illustrating the suppression of propagation alarms VC3RDI, VC12RDI in FIG. 5.

FIG. 7 is a flow chart illustrating the suppression of the propagation alarms VC2RDI, VC12RDI in the ring mode network 120.

As shown in FIG. 3, the VC3 class propagation alarm VC3RDI generated at both directions W, E of the element 28 is detected at the element 32 serving as an end terminal of the VC3 class line so that the propagation alarm VC3RDI is suppressed at the element 32. Also, the VC12 class propagation alarm VC12RDI from the both directions W, E of the element 26 is detected at the element 30 serving as an end terminal of the VC12 class lines so that the propagation alarm VC12RDI is suppressed at the element 30. If the element 30 is not an end terminal of the VC12 class lines, it moves to the next element 28 to find a terminal point, thereby suppressing the propagation alarm VC12RDI at the corresponding end terminal point.

That is, in FIG. 7, the EMS 38 confirms which direction of the element 34 which has generated the root alarm STM1LOS the propagation alarms VC3RDI, VI12RDI moves to, in step 91. At this time, the propagation alarms VC3RDI, VI12RDI move toward west direction W of the element 34 so that the EMS 38 moves to the element 32 and checks whether the element 32 is an element which has generated the root alarm STM1LOS in steps 92, 93. Here, since the element 32 is not an element which has generated the root alarm STM1LOS, the circuit connection of the corresponding element is confirmed at step 94, and the EMS 38 determines whether the circuit connection of the element 32 belongs to an end terminal in step 95. Since the VC3 class line is terminated at the element 32, the EMS 38 retrieves the information relevant to the propagation alarm from the data base in step 96 and if, at step 97, it is determined that the propagation alarm VC3RDI is in the data base, the suppression ID is marked as LOG ID number of the root alarm, thereby suppressing the propagation alarm VC3RDI (step 98).

When the propagation alarms VC3RDI, V112RDI are suppressed as described above, the EMS 38 as shown in FIG. 8 implements a suppression subroutine of the propagation alarms TU3AIS, TU12AIS in step 76.

Figure 8:
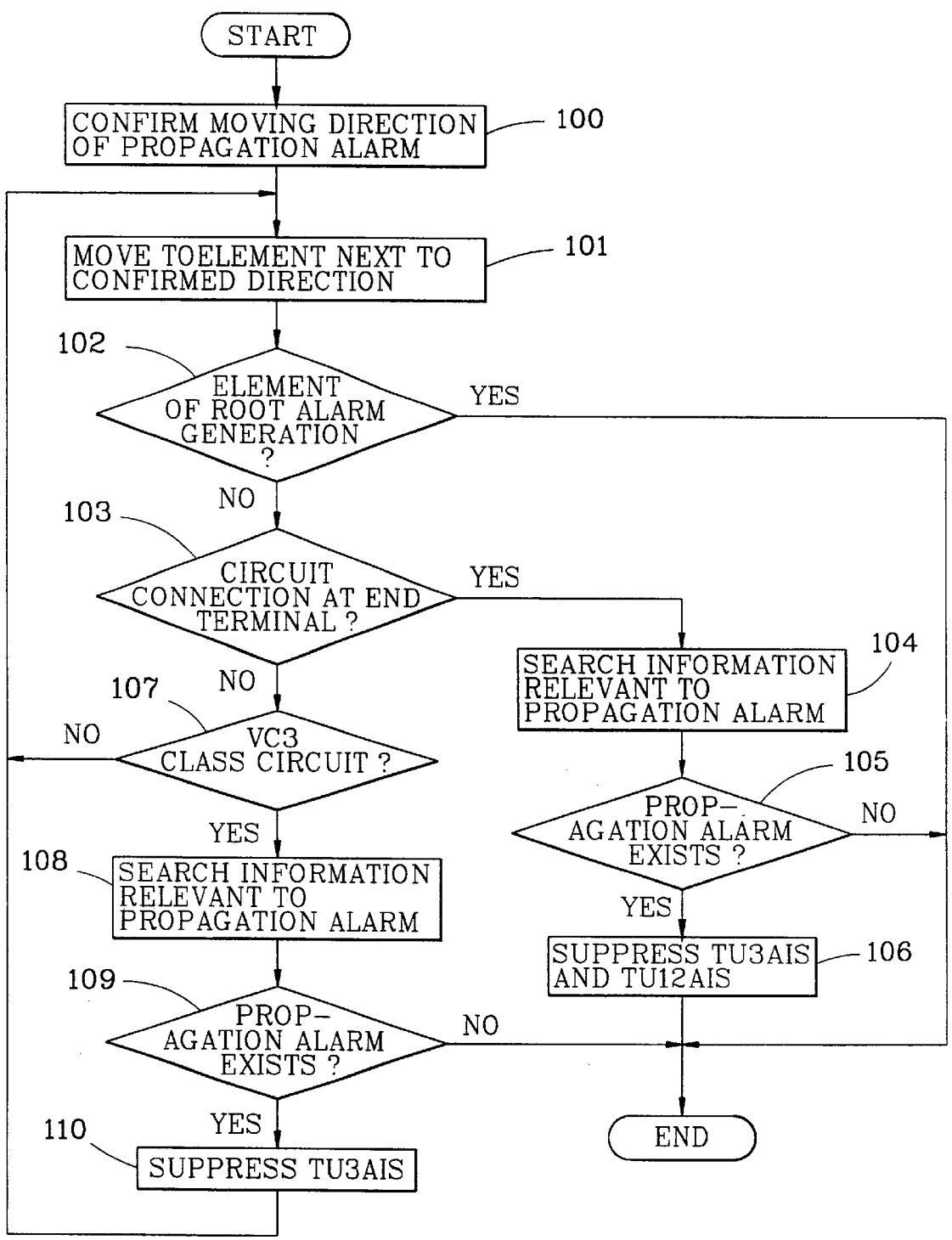
FIG. 8 is a flow chart illustrating the suppression of propagation alarms TU3AIS, TU12AIS in FIG. 5.

As shown in FIG. 8, the EMS 38 initially confirms the moving direction of the propagation alarms TU3AIS, TU12AIS in step 100. At this time, the moving direction of propagation alarms TU3AIS, TU12AIS has moved toward east direction E of the element 34 so that the EMS 38 moves to the next element 24 and checks whether the element 24 has generated the root alarm STM1LOS in steps 101, 102. If the element 24 is an element which has generated the root alarm STM1LOS, the steps are terminated and if the element 24 is not an element which has generated the root alarm STM1LOS, it is determined whether the connection state thereof belongs to an end terminal in step 103.

If the element 24 serves to an end terminal, the EMS 38 retrieves the information relevant to the propagation alarms from the data base, thereby suppressing the propagation alarms TU3AIS, TU12AIS in step 106.

Also, as shown in FIGS. 3 and 4, since the present element 24 is not an end terminal, the EMS 38 determines whether the line belongs to VC3 class. If the line belongs to VC3 class, the EMS 38 retrieves the data base and suppresses the propagation alarm TU3AIS generated from the element 24 in steps 109, 110 and moves to the element 26 so as to implement steps 101, 102, 103. Meanwhile, if the line belongs to VC12 class, the EMS 38 moves to the next element 26 and repeatedly implements steps 101, 102, 103.

At this time, since the element 26 is an end terminal of the VC12 class lines, the EMS 38 implements the steps 104, 105, 106 so as to suppress the propagation alarm TU12AIS generated from the element 26. Here, the element 26 is not an end terminal of the VC3 class line so that the EMS 38 performs steps 107, 108, 109 so as to suppress the propagation alarm TU3AIS generated from the element 26 and moves to the element 26.

Then, the EMS 38 once again implements the steps 101, 102, 103 so as to determine whether the connection state of the element 28 is an end terminal. Since the element 28 is an end terminal of VC3 class line, the EMS 38 performs the steps 104, 105, 106, thereby suppressing the propagation alarm TU3AIS generated from the element 28. Eventually, in case of the VC3 class line, the EMS 38 suppresses the propagation alarms TU3AIS generated from the elements 24, 26, 28 after the element 34 which has detected the root alarm STM1LOS, and in case of VC12 class line, the propagation alarm TU12AIS generated from the element 26 of the VC12 class line is suppressed. Accordingly, in the first embodiment of the present invention, when the root alarm is detected after the propagation alarm, all the propagation alarms generated due to the root alarm can be suppressed.

FIG. 9 is a flow chart illustrating the alarm suppressing method for an optical transmission apparatus according to a second embodiment of the present invention. In the second embodiment, a propagation alarm is again detected after the operation according to the first embodiment of the present invention, wherein the propagation alarm is detected after the root alarm.

After the root alarm is detected, when the propagation alarm is detected from west direction W of the first element, the EMS 38 employs the detection direction W of the propagation alarm and the connection state of the optical line so as to confirm the second element, thereby retrieving the second element in steps 200, 201. The EMS 38 determines the sort of the propagation alarm previously detected from the first element in step 202.

For example, when the propagation alarm VC3RDI is detected from east direction E of the element 32, the EMS 38 confirms and detects the element 34 so as to determine the kind of the propagation alarm previously detected at the element 32. Presently, since the propagation alarm VC3RDI is detected at the element 32, the EMS 38 confirms the connection state between the elements 32, 34 in step 203, and determines whether the element 34 is an element which has generated the propagation alarm VC3RDI in step 204. If it is understood that the element 34 has generated the propagation alarm VC3RDI, the EMS 38 checks whether the root alarm which has generated the propagation alarm VC3RDI is presently in the data base in step 205. If not, it is determined whether the circuit connection is at the end terminal at step 206. At this time, if the root alarm is in the data base, the LOG ID of the root alarm is marked in the suppression ID of the propagation alarm VC3RDI, thereby suppressing the propagation alarm VC3RDI in step 209.

On the other hand, when the propagation alarm MSRDI is detected from the element 32 after the detection of the root alarm, the EMS 38 detects the element 34 and determines the kind of the propagation alarm previously detected at the element 32. Presently, since the propagation alarm MSRDI is detected at the element 32, the EMS 38 detects the information relevant to the root alarm from the data base and checks whether the root propagation which has generated the propagation alarm MSRDI is presently in the data base in steps 207, 208. At this time, when the root alarm is in the data base, the LOG ID of the root alarm is marked in the suppression ID of the propagation alarm MSRDI and accordingly the propagation alarm is suppressed in step 209.

Also, when the propagation alarm TU3AIS is detected from west direction W of the element 26 after the root alarm is detected, the EMS 38 detects the element 24 and determines the kind of the propagation alarm previously detected at the element 26. Presently, since the propagation alarm TU3AIS is detected at the element 26, the EMS 38 confirms the connection state between the elements 26, 34 in step 210. If the connection state does not belong to an end terminal, the EMS 38 checks whether the root alarm which has generated the propagation alarm TU3AIS is in the data base in steps 211, 212. If the root alarm is checked to be in the data base, the LOG ID of the root alarm is marked in the suppression ID of the propagation alarm TU3AIS, thereby suppressing the propagation alarm TU3AIS in step 209.

According to the second embodiment of the present invention, when the propagation alarm is detected after the root alarm, the root alarm which has generated the propagation alarm is detected so as to suppress the propagation alarm. For convenience' sake, the elements in the ring mode network and the root alarm LOS are taken for the description. However, in case of the elements in a linear mode network and root alarms LOF (loss of frame), LOP (loss of point) may be processed in the same method.

As described above, the alarm suppressing method for an optical transmission apparatus according to the present invention clearly analyzes the mutual relation between the root alarm and the propagation alarm by detecting the root and propagation alarms from the linear network and the ring mode network.

Further, the alarm suppressing method for an optical transmission apparatus according to the present invention promptly recognizes the optical line which has generated the root alarm using the mutual relation between the root and propagation alarms and enables a prompt implementation of maintenance and management of optical lines.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claim is:

1. A method for suppressing an alarm in an optical communication network, comprising:

checking whether a detected alarm is a root alarm;

suppressing a first propagation alarm generated by the root alarm when the detected alarm is a root alarm;

determining the types of network elements;

suppressing a second propagation alarm generated by the root alarm in accordance with the determined types of the network elements; and suppressing a third propagation alarm generated in accordance with the second propagation alarm.

2. The method of claim 1, wherein the network elements include terminal multiplexers and add drop multiplexers serving as linear mode elements, and ring multiplexers serving as ring mode elements.

3. The method of claim 1, wherein the suppressing of the third propagation alarm is not implemented when the network elements are terminal multiplexers.

4. The method of claim 1, wherein the first propagation alarm is MSRDI (RDI denotes remote defect indication), the second propagation alarm varies to VC3RDI and VC12RDI, and the third propagation alarm varies to TU3AIS (AIS denotes alarm indication signal) and TU12AIS.

5. The method of claim 4, wherein the MSRDI is the alarm generated from a network element which has detected the root alarm, the TU3AIS and VC3RDI are alarms of VC3 class lines, and TU12AIS and VC12RDI are alarms of VC12 class lines.

6. The method of claim 5, wherein the VC3RDI and VC12RDI are propagation alarms generated from network elements serving as end terminals of the VC3 and VC12 class lines and generated from both directions.

7. The method of claim 1, wherein the suppressing of the first propagation alarm comprises:

recognizing a moving direction of the first propagation alarm;

recognizing a network element next to the recognized direction;

retrieving data relevant to the first propagation alarm from a database; and suppressing the first propagation alarm when the database includes the data relevant to the first propagation alarm.

8. The method of claim 7, wherein the first propagation alarm is an MSRDI generated from a network element which has detected a root alarm.

9. The method of claim 1, wherein the suppressing of the second propagation alarm comprises:

recognizing a moving direction of the second propagation alarm;

recognizing a network element next to the recognized moving direction;

confirming whether the recognized network element includes a network element which has generated the root alarm;

determining a line connection of the recognized network element when the recognized network element is not a network element which has generated the root alarm;

determining if data relevant to the second propagation alarm exists in a database when the connection is in an end terminal of the line; and suppressing the second propagation alarm when the data relevant to the second propagation alarm exists in the database.

10. The method of claim 9, wherein the alarm suppressing method is terminated when the recognized network element is a network element which has generated the root alarm, and a next network element is retrieved when the connection is not in an end terminal of a VC3 or VC12 class line.

11. The method of claim 9, wherein the second propagation alarm is VC3RDI or VC12RDI.

12. The method of claim 1, wherein the suppressing of the third propagation alarm comprises:

recognizing a moving direction of the third propagation alarm;

recognizing a next network element existing in the recognized moving direction;

confirming whether the recognized next network element is a network element which has generated a root alarm;

determining a line connection of the recognized next network element when the recognized next network element is not a network element which has generated the root alarm;

retrieving data relevant to the third propagation alarm from a database when the line connection is in an end terminal of the line; and suppressing the third propagation alarm when the database includes the data relevant to the third propagation.

13. The method of claim 12, further comprising:

determining whether the line belongs to a VC3 class when the line connection is not in an end terminal of the line;

retrieving data relevant to the third propagation alarm from the database when the line belongs to the VC3 class; and suppressing the third propagation alarm when the database includes a data relevant to the third propagation alarm.

14. The method of claim 13, wherein the third propagation alarm is TU3AIS or TU12AIS and the next network element is retrieved when the line belongs to a VC12 class.

15. A method for suppressing an alarm in an optical communication system, comprising:

confirming a moving direction of a detected propagation alarm if a propagation alarm is detected after a root alarm is detected;

recognizing a network element existing in a reverse direction of the confirmed moving direction;

checking a type of the detected propagation alarm; and retrieving information relevant to the root alarm from a database in accordance with the types of the checked propagation alarms, and suppressing a corresponding propagation alarm when the database includes the root alarm.

16. The method of claim 15, wherein the detected propagation alarm is MSRDI, and further comprising:

retrieving the information relevant to the root alarm from the database; and suppressing the MSRDI when the database includes the root alarm which has generated the MSRDI.

17. The method of claim 15, wherein the detected propagation alarm is TU3AIS or TU12AIS, and further comprising:

confirming a line connection;

terminating the alarm suppression if the line connection is in an end terminal of the line and checking whether the database includes a root alarm when the line connection is not in an end terminal of the line; and suppressing the TU3AIS or TU12AIS when the database includes the root alarm.

18. The method of claim 17, wherein the suppressing step of the TU3AIS or TU12AIS is implemented by marking a LOG ID of the root alarm in a suppression ID of the TU3AIS or TU12AIS.

19. The method of claim 15, wherein the propagation alarm is VC3RDI or VC12RDI, and further comprising:

confirming a line connection;

checking whether a network element next to the line connection is a network element which has generated the VC3RDI or VC12RDI;

checking whether the database includes the root alarm when the network element next to the line connection is not the network element which has generated the VC3RDI or VC12RDI; and suppressing the VC3RDI or VC12RDI when the database includes the root alarm and determining if the VC3RDI or VC12RDI exists in the reverse direction of the recognized moving direction when the database does not include the root alarm.

20. The method of claim 17, wherein the suppressing of the TU3AIS or TU12AIS is implemented by marking a LOG ID of the root alarm in a suppression ID of the TU3AIS or TU12AIS.

* * * * *